United States Patent Office 3,655,678
Patented Apr. 11, 1972

1

3,655,678
SUBSTITUTED-2-(1H)PYRIDONES
Chun-Shan Wang, Midland, and James P. Easterly, Bay City, Mich., assignors to The Dow Chemical Company, Midland, Mich.
No Drawing. Filed June 15, 1970, Ser. No. 46,474
Int. Cl. C07d 31/36
U.S. Cl. 260—295 R                        5 Claims

ABSTRACT OF THE DISCLOSURE

Disclosed are compounds of the formula

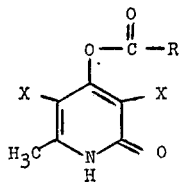

wherein X represents hydrogen or chlorine and R represents methyl, ethyl, phenyl, p-nitrophenyl or benzyl and the method of preparation and the use of these compounds as fungicides.

SUMMARY OF THE INVENTION

The present invention is directed to pyridone compounds corresponding to the formula

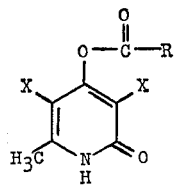

In this and succeeding formulae, X represents hydrogen or chlorine and R represents methyl, ethyl, phenyl, p-nitrophenyl or benzyl.

The pyridone compounds of the present invention are crystalline solids which are of low solubility in water and somewhat soluble in many common organic solvents. These compounds have specific utility as fungicides.

The new compounds of the present invention are prepared by reacting an appropriate 4-hydroxy-6-methyl-2(1H)pyridone with an appropriate acyl chloride in the presence of a solvent and a hydrogen chloride acceptor.

Representative pyridone reactants include, for example, 4-hydroxy-6-methyl-2-(1H)pyridone and 3,5-dichloro-4-hydroxy-6-methyl-2-(1H)pyridone. Representative acyl chloride reactants include, for example, acetyl chloride, propionyl chloride, benzoyl chloride, p-nitrobenzoyl chloride and phenylacetyl chloride.

The reaction is conveniently carried out by contacting the reactants in a halohydrocarbon solvent such as, for example, chloroform, carbon tetrachloride, methylene chloride or ethylene dichloride and in the presence of a hydrogen chloride acceptor such as, for example, triethylamine or pyridine. The reaction takes place smoothly at temperatures of from about 0° to the reflux temperature

2 and preferably at the reflux temperature of the mixture. The reaction is somewhat exothermic and the temperature can be controlled by regulation of the rate of contacting the reactants, and/or by the amount of solvent present and/or by external cooling.

In carrying out the preparation of the compounds of the present invention, the reactants are contacted together in at least equal molar proportions of the pyridone to acyl chloride. Usually, the pyridone reactant, the solvent and the hydrogen chloride acceptor are mixed together and the acyl chloride reactant added thereto. The hydrogen chloride acceptor can be employed in an equivalent amount and is preferably employed in excess of the molar amount of the reactants. The reactants are maintained under the afore-described conditions until the reaction is complete.

The solvent phase is separated from the reaction mixture by conventional separatory procedures such as filtration, decantation and the like. The solvent phase is washed with water and dried. The solvent is removed by evaporation or other conventional procedures leaving the product. The product if desired can be further purified by conventional procedures, such as, for example, crystallization from a conventional solvent, such as for example, benzene, ethyl acetate, ethanol, isopropyl alcohol, hexane, an ethanol-acetone mixture or an acetone-water mixture.

Alternatively, the compounds can be prepared by reacting an appropriate 4-hydroxy pyridone with an appropriate acid anhydride in the presence of sulfuric acid. This reaction is conveniently carried out by refluxing the mixture of the reactants in the acid for about 1 to 5 hours. The mixture is thereafter cooled to room temperature and the solids which separate are recovered, washed with water and purified by conventional procedures, such as those hereinbefore set forth.

The compounds which contain chlorine in the 3- and 5-positions can be prepared by either employing a pyridone reactant containing chlorine in those positions or by chlorinating the unchlorinated product compound. The chlorination reaction can be carried out by dissolving the unchlorinated compound in a solvent such as glacial acetic acid and slowly adding gaseous chlorine thereto, with agitation, while maintaining the temperature between 10° and 30° C. Upon completion of the chlorination reaction, water is added thereto to precipitate the product as a solid. This product can be further purified by conventional procedures, such as those hereinbefore described.

DESCRIPTION OF SOME PREFERRED EMBODIMENTS

The following examples illustrate the present invention and the manner by which it can be practiced, but as such, should not be construed as limitations upon the overall scope of the same.

EXAMPLE I 4-acetoxy-6-methyl-2(1H)-pyridone

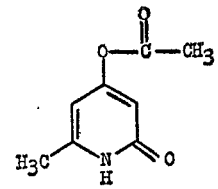

To a mixture containing 250 milliliters of chloroform, 12.5 grams (0.1 mole) of 4-hydroxy-6-methyl-2(1H)-pyridone and 10.1 grams (0.1 mole) of triethylamine at room temperature was added slowly 7.9 grams of acetyl chloride. The mixture was refluxed for 5 hours and thereafter the chloroform phase was separated. This phase was washed three times with 100 milliliter portions of water and the chloroform removed by evaporation on a rotary evaporator. The crude 4-acetoxy-6-methyl-2(1H)-pyridone product which remained was purified by recrystallization twice from an acetone-water mixture and recovered in a yield of 8.3 grams. The product melted at 202°–203° C. and was found by analysis to have carbon, hydrogen and nitrogen contents of 56.9, 5.5 and 8.5 percent, respectively, as compared with the theoretical contents of 57.5, 5.4 and 8.4 percent, respectively, calculated for the above structure.

In another preparatory procedure, a mixture containing 12.5 grams (0.1 mole) of 4-hydroxy-6-methyl-2(1H)-pyridone, 11.2 grams (0.11 mole) of acetic anhydride and 0.5 milliliter of 95.5 percent sulfuric acid were refluxed at a temperature between 110° to 120° C. for two hours. The mixture was cooled and the solid which precipitated was recovered by filtration, washed and recrystallized from ethanol. The 4-acetoxy-6-methyl-2(1H)-pyridone product was recovered in a yield of 15.1 grams and its structure was confirmed by infrared spectroscopy.

EXAMPLE II 4-acetoxy-3,5-dichloro-6-methyl-2(1H)-pyridone

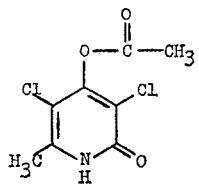

A solution is prepared by dissolving 16.7 grams (0.1 mole) of 4-acetoxy-6-methyl-2(1H)-pyridone, prepared as above (Example I), in 150 milliliters of glacial acetic acid. To this solution 14.2 grams (0.2 mole) of chlorine gas was sparged therein while the reaction temperature was maintained at 20° C. Upon completion of the chlorine addition, 500 milliliters of water was added thereto. The precipitate thus formed was recovered by filtration and washed with water and dried. The 4-acetoxy-3,5-dichloro-6-methyl-2(1H)-pyridone product was recovered in a yield of 21 grams and melted at 230°–232° C.

EXAMPLE III 4-(p-nitrobenzoyloxy)-6-methyl-2(1H)-pyridone

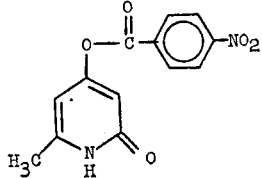

To a solution containing 12.5 grams (0.1 mole) of 4-hydroxy-6-methyl-2(1H) - pyridone, 10.1 grams (0.1 mole) of triethylamine and 250 milliliters of chloroform was added, with agitation, 18.6 grams (0.1 mole) of p-nitrobenzoyl chloride. The mixture was refluxed for 5 hours and cooled to room temperature. The chloroform layer was separated and washed three times with 100 milliliter portions of water. The chloroform was removed by evaporation on a rotary evaporator and the crude 4-(p-nitrobenzoyloxy)-6-methyl-2(1H)-pyridone which remained as a residue was recrystallized twice from an acetone-water mixture. The product is recovered in a yield of 16.5 grams and melted at 243°–245° C.

The following compounds of the present invention are prepared in accordance with the methods set forth hereinbefore: 4 - propionyloxy - 6 - methyl - 2(1H)-pyridone having a molecular weight of 181.09, prepared by the reaction of 4-hydroxy-6-methyl-2(1H)-pyridone and propionyl chloride; 3,5-dichloro-4-propionyloxy-6-methyl-2(1H)-pyridone having a molecular weight of 250.01, prepared by the reaction of 3,5-dichloro-4-hydroxy - 6 - methyl - 2(1H)-pyridone and propionyl chloride; 4 - (phenyl acetoxy) - 6 - methyl - 2(1H)-pyridone having a melting point of 153°–154° C., prepared by the reaction of 4 - hydroxy-6-methyl-2(1H)-pyridone and phenyl acetyl chloride.

In accordance with the present invention, it has been discovered that the pyridones can be employed in the control of many fungal pests. For such uses, the compounds can be employed in an unmodified form or dispersed on a finely divided solid and employed as dusts. Such mixtures can also be dispersed in water with or without the aid of a surface-active agent and the resulting aqueous suspension employed as active constituents in solvent solutions, oil-in-water or water-in-oil emulsions or aqueous dispersions. The augmented compositions are adapted to be formulated as concentrates and subsequently diluted with additional liquid or solid diluents to produce the ultimate treating compositions.

The exact concentration of the toxicant to be employed in the treating compositions is not critical and may vary considerably provided the required dosage of the effective agent is supplied. The concentration of toxicant in liquid compositions generally is from about 0.0001 to 50 percent by weight. Concentrations up to 95 percent by weight are oftentimes conveniently employed, particularly in concentrate compositions. In dusts, the concentrations of the toxicant can be from about 0.1 to 95 percent by weight. In compositions to be employed as concentrates, the toxicants can be present in a concentration of from 5 to 98 percent by weight.

In a representative operation, substantial kill and control of the causative organisms of tomato late blight and rice blast was obtained when 4 - acetoxy-3,5-dichloro-6-methyl-2(1H)-pyridone was employed as the sole toxicant in a liquid dispersion at a concentration of 400 parts per million by weight of the ultimate dispersion.

In another operation, each of 4-(p-nitrobenzoyloxy)-6-methyl - 2(1H)-pyridone, 4-acetoxy-6-methyl-2(1H)-pyridone and 4 - (phenyl acetoxy) - 6 - methyl - 2(1H)-pyridone, when employed as the sole toxicant in a nutrient agar at a concentration of 500 parts by weight of the compound per million parts of agar, gave 100 percent kill and control of the organism *Mycobacterium phlei*.

In other operations, 4 - acetoxy-6-methyl-(2-(1H)-pyridone when employed as the sole toxicant in a nutrient agar at a concentration of 500 parts by weight of the compound per million parts of agar, gave 100 percent kill and control of the organisms *Trichophton mentagrophytes, Bacillus subtilis* and *Cephaloascus fragans*.

In another representative operation, 4-(phenyl acetoxy) - 6-methyl-2(1H)-pyridone when employed as the sole toxicant in a nutrient agar at a concentration of 500 parts by weight of the compound per million parts of agar, gave 100 percent kill and control of the organisms *Trichophton mentagrophytes, Pullularia pullulans, Ceratocystis ips., Cephaloascus fragans* and Trichoderm sp.

What is claimed is:
1. A compound corresponding to the formula

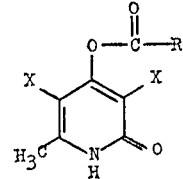

wherein X represents hydrogen or chlorine and R represents methyl, ethyl, phenyl, p-nitrophenyl or benzyl.

2. The compound of claim 1 which is 4-acetoxy-6-methyl-2(1H)-pyridone.

3. The compound of claim 1 which is 4-acetoxy-3,5-dichloro-6-methyl-2(1H)-pyridone.

4. The compound of claim 1 which is 4-(phenyl acetoxy)-6-methyl-2(1H)-pyridone.

5. The compound of claim 1 which is 4-(p-nitrobenzoyloxy)-6-methyl-2(1H)-pyridone.

References Cited

UNITED STATES PATENTS 2,901,488   8/1959   Liberman _____ 260—295

ALAN L. ROTMAN, Primary Examiner

U.S. Cl. X.R.

260—297 Z; 424—266